(12) United States Patent
Niffenegger et al.

(10) Patent No.: US 10,054,222 B2
(45) Date of Patent: Aug. 21, 2018

(54) HYDRAULIC SYSTEM OF A VEHICLE POWERTRAIN

(71) Applicant: BorgWarner Inc., Auburn Hills, MI (US)

(72) Inventors: Donn W. Niffenegger, Warren, MI (US); Larry A. Pritchard, Macomb, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 252 days.

(21) Appl. No.: 14/940,521

(22) Filed: Nov. 13, 2015

(65) Prior Publication Data

US 2016/0146271 A1 May 26, 2016

Related U.S. Application Data

(60) Provisional application No. 62/083,539, filed on Nov. 24, 2014.

(51) Int. Cl.
| | |
|---|---|
| *F16D 25/12* | (2006.01) |
| *F16D 31/02* | (2006.01) |
| *F16H 63/30* | (2006.01) |
| *F16H 63/04* | (2006.01) |
| *F16H 61/00* | (2006.01) |
| *F16D 25/0638* | (2006.01) |

(52) U.S. Cl.
CPC ..... *F16H 63/3023* (2013.01); *F16H 61/0025* (2013.01); *F16H 63/04* (2013.01); *F16H 63/3069* (2013.01); *F16D 25/0638* (2013.01)

(58) Field of Classification Search
CPC ............ F16H 63/3023; F16H 61/0025; F16H 63/3069; F16H 63/04; F16D 25/0638; F16D 48/02; F16D 2048/0248; F16D 2048/0245; F16D 2048/0269; F16D 2048/0203
See application file for complete search history.

(56) References Cited

U.S. PATENT DOCUMENTS

| | | | | |
|---|---|---|---|---|
| 5,857,381 A | * | 1/1999 | Mentink | F15B 7/006 60/468 |
| 6,000,294 A | * | 12/1999 | Jackson | F16H 61/30 74/335 |
| 8,429,907 B2 | * | 4/2013 | Gronli | F15B 21/14 60/414 |
| 2006/0070378 A1 | * | 4/2006 | Geiger | B29C 45/67 60/475 |

(Continued)

*Primary Examiner* — Ramya P Burgess
*Assistant Examiner* — Lillian T Nguyen

(57) ABSTRACT

A vehicle powertrain hydraulic system (10) includes a clutch (12), a piston (62) disposed in a cylinder (60) to drive a shift selector (14), a pump (82) in fluid communication with a fluid supply (86) to pressurize fluid, and first and second fluid pressure lines (91, 92) from the pump to first and second sides of the piston. A third fluid pressure line (93) may extend to the clutch from the cylinder in a location between the first and second sides of the piston, such that the piston also may be a valve to control fluid flow to the clutch. The pump may be reversible and coupled to an electric motor (80), and a centrifugal regulator (84) may be coupled to the motor and in fluid communication with the first and second pump pressure lines to regulate fluid pressure therein. A related operational method is also disclosed.

14 Claims, 3 Drawing Sheets

(56) References Cited

U.S. PATENT DOCUMENTS

2007/0170680 A1\* 7/2007 Knaap ................ B60G 17/0152
  280/124.106
2012/0244023 A1\* 9/2012 Nilsson ................. F04B 1/2035
  417/410.1

\* cited by examiner

HYDRAULIC SYSTEM OF A VEHICLE POWERTRAIN

CROSS-REFERENCE TO RELATED APPLICATIONS

This application claims the benefit of U.S. Patent Application No. 62/083,539 filed Nov. 24, 2014, the disclosure of which is herein incorporated in its entirety.

TECHNICAL FIELD

The present disclosure relates generally to motor vehicle powertrains and, more particularly, to powertrain hydraulic systems.

BACKGROUND

A motor vehicle typically includes a powertrain including a prime mover to generate torque, a transmission coupled to the prime mover to leverage the torque, and a drivetrain coupled to the transmission to distribute the torque to wheels of the vehicle. In addition to the transmission, other powertrain products downstream of the prime mover may include transfer cases, axles, differentials, power takeoff units, all-wheel-drive (AWD) couplings, and other drivetrain products. Drivetrain products can enable a vehicle drivetrain to change from one drivetrain mode to another and/or to adjust distribution of torque from one portion of a drivetrain to another. More specifically, transfer cases can enable changes from a two-wheel-drive (2WD) mode to a four-wheel-drive (4WD) mode and vice versa, changes from a high range 4WD mode to a low range 4WD mode and vice versa, application of an on-demand 4WD mode, distribution of torque between front and rear wheels and/or right and left wheels, as well as other drivetrain functionality.

SUMMARY

In one embodiment, a vehicle powertrain hydraulic system includes a clutch, a shift selector, a piston and cylinder assembly including a piston disposed in a cylinder to drive the shift selector, a fluid supply, a reversible pump in fluid communication with the fluid supply to pressurize fluid from the fluid supply, a first fluid pressure and control line from the pump to a first side of the piston, a second fluid pressure and control line from the pump to a second side of the piston, and a third fluid pressure line to the clutch from the cylinder in a location between the first and second sides of the piston, wherein the piston is also a valve to control fluid flow through the third fluid pressure line from the cylinder to the clutch.

In another embodiment, a vehicle powertrain hydraulic system includes a clutch, a shift selector, a piston and cylinder assembly including a piston disposed in the cylinder to drive the shift selector, and a fluid supply. The system also includes a hydraulic pump and regulator apparatus, including an electric motor, a reversible pump in fluid communication with the fluid supply and coupled to the motor to pressurize fluid from the fluid supply, and a centrifugal regulator coupled to the motor. The system further includes a first fluid pressure line from the pump to a first side of the piston, and a second fluid pressure line from the pump to a second side of the piston, wherein the centrifugal regulator is in fluid communication with the first and second pump pressure lines.

In a further embodiment, a method of operating a hydraulic system of a vehicle powertrain product, comprises the following steps. A reversible pump is operated in a first mode and in a first rotational direction, with a pressure regulator in a recirculation position, to draw fluid from a fluid supply through a first pump supply line and expel fluid under pressure through a first fluid pressure line through a pressure regulator back to the fluid supply. The pump is operated in a second mode and at a rotational speed faster than that of the first mode, with the pressure regulator in a diversion position, to divert fluid to a first piston pressure chamber against a first side of a piston coupled to a shift selector to thereby displace the shift selector from a first detent position to a second detent position. The pump is operated in a third mode and in an opposite second rotational direction with the pressure regulator in the recirculation position, to draw fluid from the fluid supply through a second pump supply line and expel fluid under pressure through a second fluid pressure line through the pressure regulator back to the fluid supply. The pump is operated in a fourth mode and at a rotational speed faster than that of the third mode, with the pressure regulator in the diversion position, to divert fluid to a second piston pressure chamber against a second side of the piston to thereby displace the shift selector from the second detent position to the first detent position. During and after the second mode of operation, the piston is moved to a first position that closes off a second fluid inlet of a cylinder in which the piston is disposed and opens communication between a first fluid inlet of the cylinder and a fluid outlet of the cylinder so that fluid pressurized by the pump flows to a clutch to activate the clutch. During and after the fourth mode of operation, the piston is moved to a second position that closes off the first fluid inlet and opens communication between the second fluid inlet and the fluid outlet so that fluid pressurized by the pump flows to the clutch to activate the clutch. The clutch is deactivated when the piston is moved to an intermediate third position between the first and second positions such that the piston closes off the fluid outlet from the first and second fluid inlets, such that piston is also a valve to control fluid flow through the third fluid pressure line from the cylinder to the clutch.

DETAILED DESCRIPTION

Figure 1:
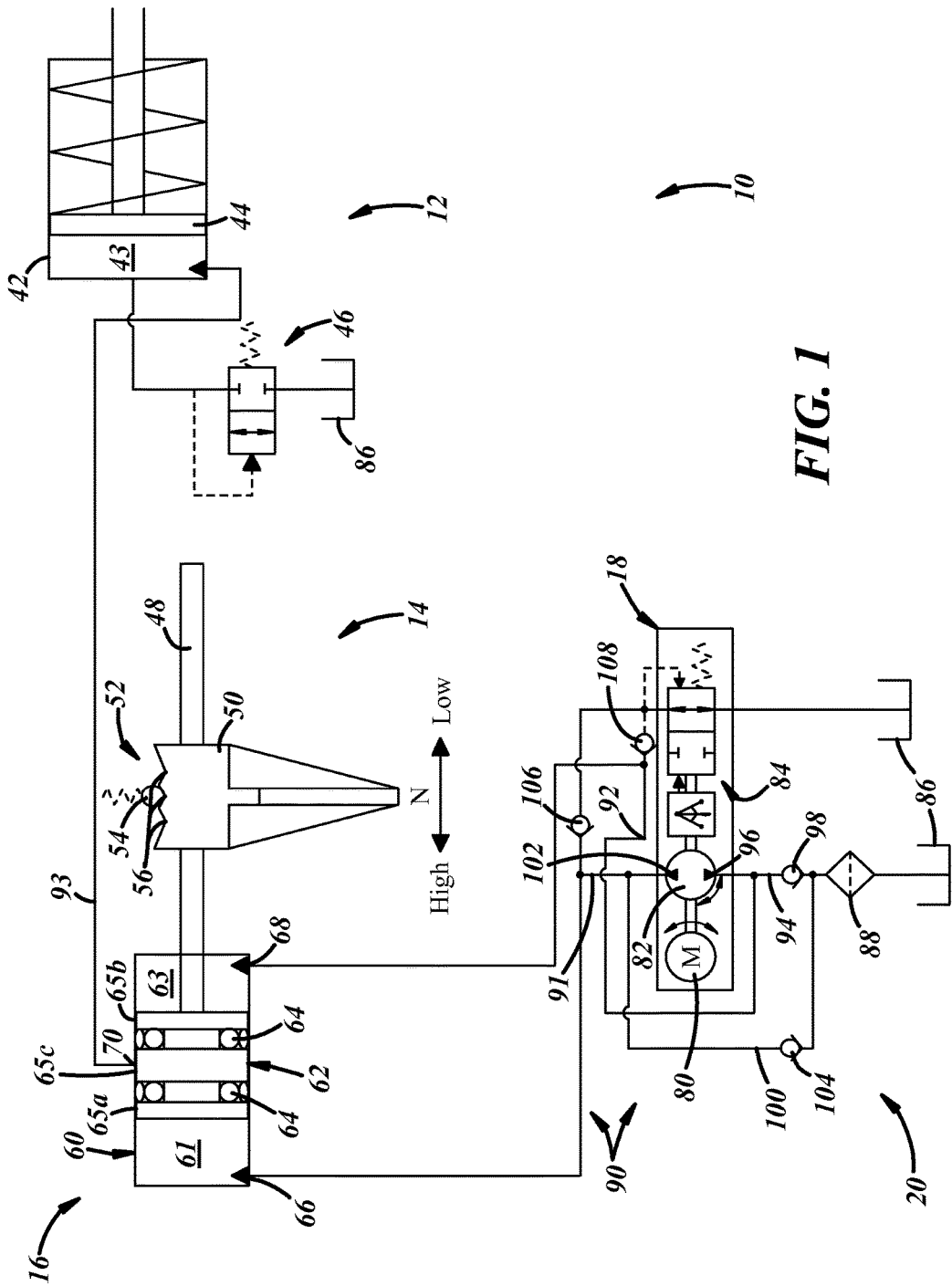
FIG. 1 is a hydraulic schematic diagram of a portion of a vehicle powertrain hydraulic system in accord with an example embodiment of the present disclosure.

The drawing figures illustrate embodiments of a vehicle powertrain hydraulic system 10 equipped with one or more unique and inventive arrangements of components to provide increased powertrain efficiency and/or responsiveness. With reference to FIG. 1, in general, the system 10 includes a clutch 12 to engage and/or disengage one powertrain component to/from another powertrain component either partially or completely. Further, the system 10 includes a shift selector 14 to adjust a powertrain product operating mode, for example, from a 4×2 mode to a 4×4 mode or vice-versa, a high-to-low 4×4 range adjustment or vice-versa, form a drive mode to a neutral mode, a gear ratio change, or the like. Additionally, the system 10 includes a piston and cylinder assembly 16 to drive the shift selector 14 under application of fluid pressure in the assembly 16. Moreover, the system 10 includes a hydraulic pump and regulator apparatus 18 that produces and controls fluid pressure supplied to the piston and cylinder assembly 16, and that also may be supplied to the clutch 12. Also, the system 10 includes a fluid distribution system 20 that distributes fluid to and from the piston and cylinder assembly 16, and that also may distribute fluid to and from the clutch 12.

Figure 1A:
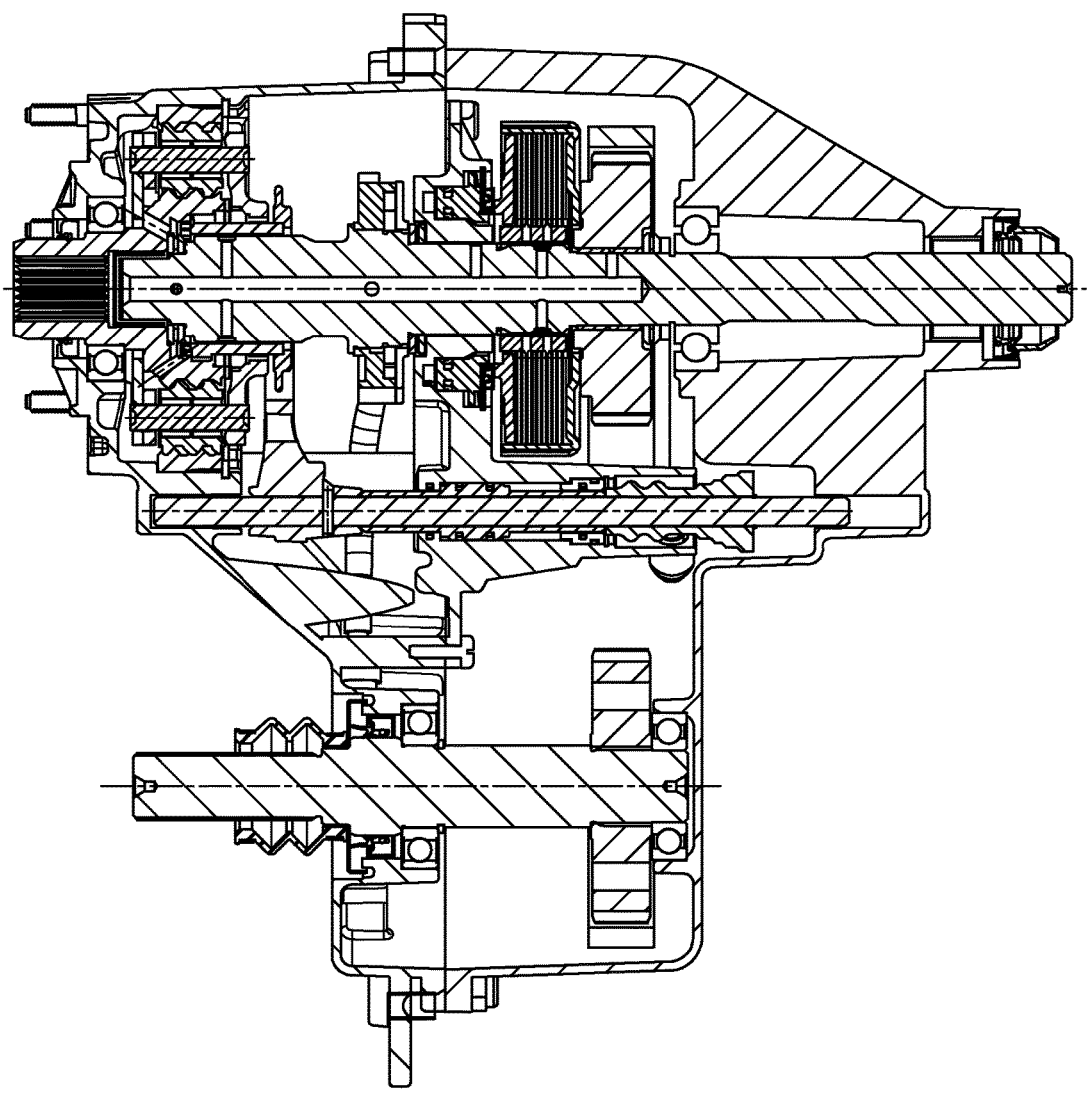
FIG. 1A is a cross-sectional view of a transfer case that includes the portion of the vehicle powertrain hydraulic system of FIG. 1.

The system 10 may be equipped in any suitable location(s) of a powertrain of a motor vehicle (not separately shown) for any suitable purpose. For instance, the system 10 may be part of a powertrain product, for example, with reference to FIG. 1A, a transfer case for distributing torque between front wheels and rear wheels of the vehicle to provide 2×2 functionality and 4×4 functionality, which also may include high and low range modes of 4×4 operation. In another example, the powertrain product may include an axle for changing direction of torque and controlling torque, for instance, a rear axle between rear wheels of the vehicle, a front axle between front wheels of the vehicle, or a transaxle between front or rear wheels of the vehicle. In a further example, the powertrain product may include an all-wheel-drive (AWD) coupling between front wheels or rear wheels of the vehicle for controlling torque therebetween.

Figure 2:
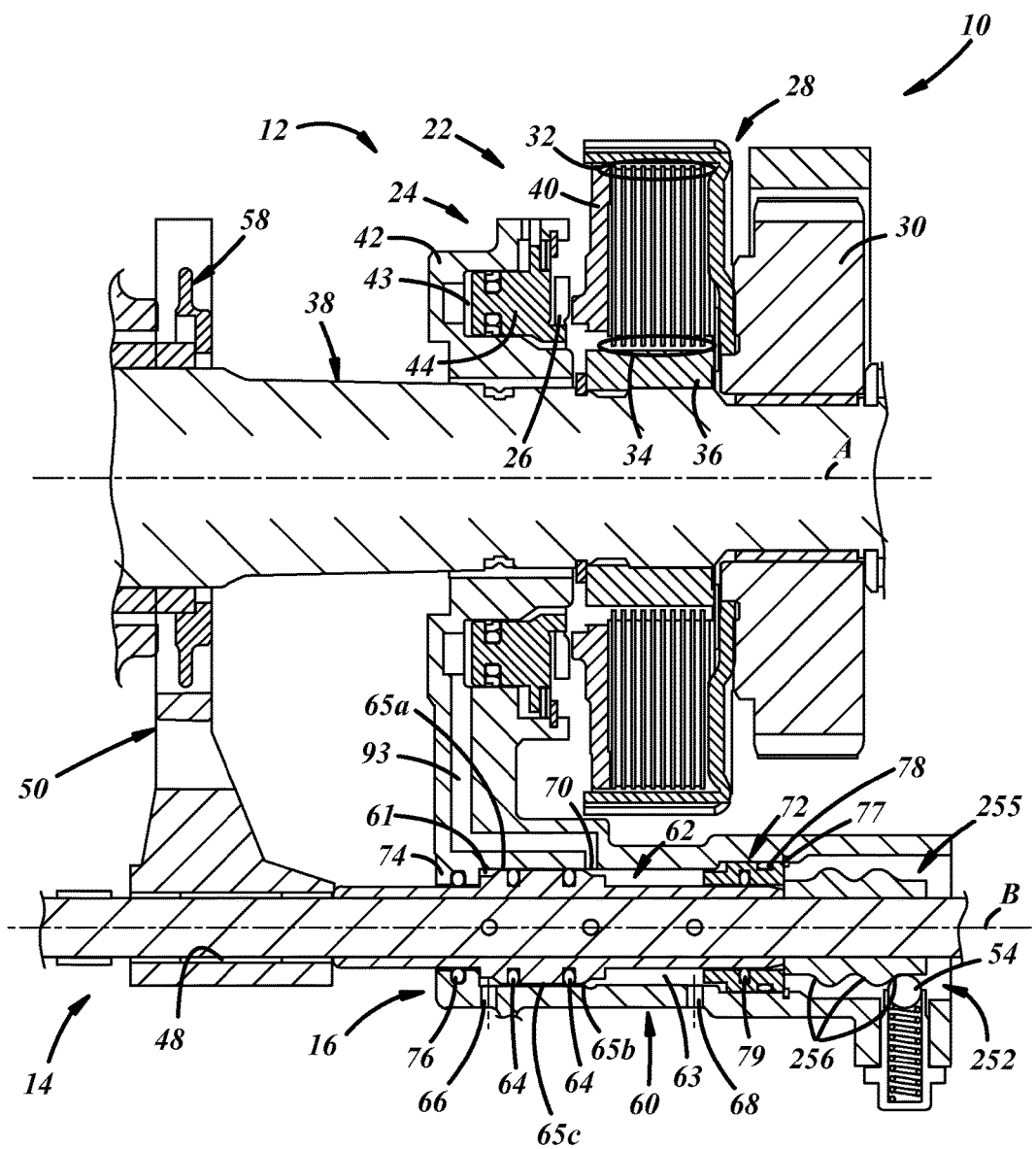
FIG. 2 is a fragmentary cross-sectional view of the portion of the hydraulic system of FIG. 1 taken from circle 2 of FIG. 1A.

With reference to FIG. 1, the clutch 12 may be any suitable type of clutch for partially or fully releasably coupling one portion of a powertrain to another. For example, the clutch 12 may include a brake band or band-type clutch, a dry plate type of clutch, or, as illustrated in FIG. 2, a wet plate type of clutch. With reference to FIG. 2, the clutch 12 may include a clutch pack or clutch assembly 22, a clutch actuator 24 disposed axially adjacent to the clutch assembly 22 to actuate the clutch assembly 22, and a thrust bearing 26 disposed between the clutch actuator 24 and the clutch assembly 22 to facilitate relative rotation therebetween. The clutch assembly 22 may include a housing 28 that may be coupled to a chain sprocket 30 or any other suitable component, and first clutch plates 32 carried in and coupled to the housing 28. The assembly 22 also may include second clutch plates 34 interspersed with the first clutch plates 32, carried in the housing 28, and coupled to a hub 36 that may be coupled to a shaft 38 having a longitudinal axis A. The assembly 22 further may include a pressure plate 40 carried in and coupled to the housing 28 for evenly distributing pressure applied to the plates 32, 34. The clutch actuator 24 may include a cylinder 42 disposed around the shaft 38, a piston 44 carried in the cylinder 42, and a piston pressure chamber 43 between the cylinder 42 and the piston 44. The bearing 46 may be disposed between the clutch actuator piston 44 and the pressure plate 40 of the clutch assembly 22.

With reference to FIG. 1, the clutch 12 also may include, or be associated with, a pressure regulator 46 in fluid communication with the piston pressure chamber 43 to regulate fluid pressure being applied to the clutch 12. The clutch pressure regulator 46 may include a pressure relief valve, overpressure regulator, or any other suitable device to regulate clutch application fluid pressure. In one example, the regulator 46 may be set to relieve clutch application pressure at 40 bar, or any other suitable value.

The shift selector 14 may include a shift rail 48 and a shift fork 50 coupled to the shift rail 48 for axial movement therewith, or any may include any other type of shift selector components suitable to select between powertrain product operating modes. The shift selector 14 also may include a detent arrangement 52 to hold the shift selector 14 in detents corresponding to different modes of the powertrain product, for example, high, low, and neutral 4×4 range modes or, in another example, 1st gear, 2nd gear, etc. As shown in FIG. 1, the detent arrangement may include a spring-loaded element 54 in engagement with detent features 56 of a portion of the shift fork 50.

With reference to FIG. 2, the shift rail 48 extends along a longitudinal axis B offset from the longitudinal axis A of the shaft 38, and the shift fork 50 carries a coupling element 58 to couple/uncouple rotational elements to/from one another. For example, the coupling element 58 may be used to couple/uncouple a planetary sun gear and/or a planetary carrier to/from the shaft 38. Also, in another form, a detent arrangement 252 may include the spring-loaded element 54 in engagement with detent features 256 of the shift rail 48 or of a detent component 255 coupled to the shift rail 48.

With reference to FIG. 1, the piston and cylinder assembly 16 may include a shift selector cylinder 60, a shift selector piston 62 disposed in the cylinder 60, first and second pressure chambers 61, 63 between corresponding first and second sides of the piston 62 and the cylinder 60, and seals 64 to seal off the chambers 61, 63 from one another. The piston 62 may include a first land 65a, a second land 65b, and a third land 65c between the first and second lands 65a, 65b, wherein the seals 64 may be carried between the third land 65c and each of the first and second lands 65a,b. The cylinder 60 includes a first fluid inlet 66 at the first side of the piston 62, a second fluid inlet 68 at the second side of the piston 62, and a fluid outlet 70 between the first and second fluid inlets 66, 68.

With reference to FIG. 2, the cylinder 60 may be part of a larger structural support assembled within the transfer case housing. For example, the cylinder 60 and the clutch cylinder 42 may be an integral housing. Also, the piston 62 is coupled to the shift rail 48 to move axially within the cylinder 60 between a first axial stop established by a collar 72 carried in the cylinder 60 and a second axial stop established by a transversely extending wall 74 of the cylinder 60 that may carry an internal seal 76 for sealing with the piston 62. The collar 72 may be retained within the cylinder 60 by a snap ring, circlip, or any other suitable retainer 77, and may carry an outer seal 78 for sealing with the cylinder 60 and an inner seal 79 for sealing with the piston 62. The detent arrangement 252 may be carried within the cylinder 60, and spaced apart from the shift fork 50 on a side of the piston 62 of the piston and cylinder assembly 16 opposite that of the shift fork 50.

With reference to FIG. 1, the hydraulic pump and regulator apparatus 18 may include an electro-hydraulic pump and centrifugal regulator apparatus, which may include a prime mover 80, a pump 82 coupled to and rotatably driven by the prime mover 80, and/or a pressure regulator 84 coupled to and rotatably driven by the prime mover 80. Moreover, the pump 82 may be reversible and, likewise, the prime mover 80 may be reversible so as to reversibly drive the pump 82. As used herein, the term "reversible" includes bi-directional rotational operation. The prime mover 80 may include a DC brush motor, or any other suitable type of electric motor. Also, the pump 82 may be rendered reversible by virtue of the prime mover 80 when the prime mover 80 itself is reversible, or by a reversible coupling (not shown) between the prime mover 80 and the pump 82, or by any other suitable arrangement. In any case, the pump 82 may include a gear or gerotor pump, a vane pump, a radial piston pump, an axial piston pump, or any other suitable type of pump. The pressure regulator 84 may include a centrifugal regulator and, thus, may include one or more centrifugally actuated valves, which may be normally open in a recirculation position to facilitate recirculation of fluid, and which may close in a diversion position at a desired rotational speed of the regulator 84 so as to divert fluid flow to the piston 62. The apparatus 18 may be comprised of separate and distinct sub-assemblies, or may be an integrated product, for example, a centrifugal electro-hydraulic (CEH) piston pump and regulator of a HALDEX Generation V brand powertrain torque coupling available from the assignee hereof.

The fluid distribution system 20 may be self-contained or may be distributed amongst the aforementioned sub-systems of the hydraulic system 10. The fluid distribution system 20 includes a fluid supply 86, a filter 88 between the fluid supply 86 and the pump 82, and several fluid lines 90 between the fluid supply and the piston and cylinder assembly 16 and the clutch 12. The fluid supply 86 may include a reservoir, sump, supply line, or any other suitable source of fluid, which may be at atmospheric pressure or may be pressurized to some degree. The fluid in the supply 86 may be oil, hydraulic fluid, or any other fluid suitable for actuating elements of powertrain products.

The fluid lines 90 include pressure lines and supply lines. More specifically, the fluid lines 90 include first and second fluid pressure lines 91, 92 from the pump and regulator apparatus 18 to the piston and cylinder assembly 16, and also may include a third fluid pressure line 93 to the clutch 12 from the piston and cylinder assembly 16 and in a location of the cylinder 60 between the first and second fluid pressure lines 91, 92. Accordingly, the piston and cylinder assembly 16 also may control fluid flow through the third fluid pressure line 93 to the clutch 12. The fluid lines 90 also include a first pump supply line 94 between the fluid supply 86 and a first port 96 of the pump 82, a first supply check valve 98 in the first pump supply line 91, a second pump supply line 100 between the fluid supply 86 and a second port 102 of the pump 82 and having an upstream end located upstream of the first supply check valve 98, and a second supply check valve 104 in the second pump supply line 100.

The first fluid pressure line 91 extends between the second port 102 of the pump 82 and the first side of the piston 62, and the second fluid pressure line 91 extends between the first port 96 of the pump 82 and the second side of the piston 62 and has an upstream end between the first supply check valve 98 and the first port 96 of the pump 82. The pressure regulator 84 is in fluid communication with the first and second fluid pressure lines 91, 93. A first pressure check valve 106 may be disposed between the pressure regulator 84 and the second port 102 of the pump 82, and a second pressure check valve 108 may be disposed between the pressure regulator 84 and the first port 96 of the pump 82. The first and second fluid pressure lines 91, 93 extend from the pump 82 to the first and second sides of the piston 62, respectively, and the third fluid pressure line 93 extends to the clutch 12 from the cylinder 60 in a location between the first and second sides of the piston 62. Accordingly, the piston 62 also may be a valve to control fluid flow out of the fluid outlet 70 and through the third fluid pressure line 93 from the cylinder 60 to the clutch 12. As shown in FIG. 2, the third fluid pressure line 93 may extend through a housing from the shift selector cylinder 60 portion of the housing to the clutch actuator cylinder 60 portion of the housing. For example, the pressure line 93 may extend through an intermediate portion of the integral housing that may be established by the cylinder 60 and the clutch cylinder 42. The integral housing may be a casting and the pressure line 93 may be cast, formed, or machined in the housing, or provided in any other suitable manner.

In operation, the pump 82 pressurizes the fluid distribution system 20 in a manner suitable to actuate the shift selector 14, and also may pressurize the fluid distribution system 20 to actuate the clutch 12. In a first mode of operation, the pump 82 is driven in a first direction to draw fluid from the fluid supply 86 through the filter 88, through the first supply check valve 98, and through the rest of the first pump supply line 94. Additionally, in the first mode, the pump 82 normally expels fluid under pressure through the first fluid pressure line 91, through the first pressure check valve 106, through the pressure regulator 84, and back to the fluid supply 86. In a second mode of operation, the pump 82 is driven at a speed greater than that of the first mode and sufficient to actuate the pressure regulator 84 to a closed position wherein, for example, fluid is diverted by the regulator 84 to flow to the first piston pressure chamber 61 against the first side of the piston 62 to displace the piston 62 and thereby displace the shift selector 14, for example, from a high position to a neutral position or from the neutral position to a low position.

In a third mode of operation, the pump 82 is driven in a second direction opposite of the first direction to draw fluid from the fluid supply 86 through the filter 88, through the second supply check valve 104, and through the rest of the second pump supply line 100. Additionally, in the third mode, the pump 82 normally expels fluid under pressure through the second fluid pressure line 92, through the second pressure check valve 108, through the pressure regulator 84, and back to the fluid supply 86. In a fourth mode of operation, the pump 82 is driven at a speed greater than that of the third mode and sufficient to actuate the pressure regulator 84 to the closed position wherein, for example, fluid is diverted by the regulator 84 to flow to the second piston pressure chamber 63 against the second side of the piston 62 to displace the piston 62 and thereby displace the shift selector 14, for example, from the low position to the neutral position or from the neutral position to the high position. Accordingly, the hydraulic system 10 includes a unique and inventive arrangement to carry out gear shifts, range shifts, or other mode changes.

Additionally, the hydraulic system 10 may include a unique and inventive arrangement to actuate the clutch 12 during one or more of the aforementioned modes of operation. For example, during and after the second mode of operation, the piston 62 moves to a position that closes off the second fluid inlet 68 of the cylinder 60 and opens communication between the first fluid inlet 66 of the cylinder 60 and the fluid outlet 70 of the cylinder 60 so that fluid pressurized by the pump 82 flows to the clutch 12 to activate or apply the clutch 12. In a similar example, during and after the fourth mode of operation, the piston 62 moves to a position that closes off the first fluid inlet 66 and opens communication between the second fluid inlet 68 and the fluid outlet 70 so that fluid pressurized by the pump 82 flows to the clutch 12 to activate or apply the clutch 12. Additionally, according to this arrangement, the clutch 12 may be deactivated when the piston 62 is moved to an intermediate position such that the intermediate land 65c of the piston 62 closes off the fluid outlet 70 from the first and second fluid inlets 66, 68. For example, the piston 62 may be moved to the intermediate position by driving the pump 82 until a detent/ball switch (not shown) senses that the piston 62 has been moved to the intermediate position, and signals deactivation of the motor 80 and, thus, deactivation of the pump 82. Those of ordinary skill in the art will recognize that the piston 62 may be moved to the intermediate position in any other suitable manner using any other suitable switches, valves, sensors, or the like. Accordingly, the first and second fluid pressure lines 91, 92 may serve as first and second pressure and control lines, not only for pressurizing the piston chambers 61, 63 to actuate the piston 62 and shift selector 14, but also to control the communication of the first or second fluid inlets 66, 68 of the cylinder 60 with the fluid outlet 70.

The present disclosure is directed specifically to the structural arrangement of the hydraulic system 10. Shift scheduling, timing, priority, and protocol are beyond the scope of the present disclosure and, thus, those of ordinary skill in the art will understand that any suitable system for monitoring and controlling the presently disclosed system 10 may be used. For example, although not illustrated, an electronic controller may be used to carry out various aspects of operation of the hydraulic system 10. In one example, the electronic controller may receive input data from a user and/or sensors, process the received input in light of stored software and/or data, and transmit output signals to the prime mover 80. The electronic controller may be part of the powertrain product, or may be separate therefrom and electrically coupled thereto. The electronic controller generally may include memory, a processor coupled to the memory, one or more interfaces coupled to the processor, one or more input devices coupled to the processor, and/or one or more output devices coupled to the processor. Of course, the electronic controller further may include any ancillary devices, for example, clocks, internal power supplies, etc. Although not shown, the electronic controller may be supplied with electricity by an external power supply, for example, an AC to DC transformer, one or more batteries, fuel cells, etc.

The system 10 may exclude various components previously required in prior art vehicle powertrain hydraulic systems. For example, the system 10 may exclude an additional electromechanical valve in the pump pressure lines between the reversible pump and the clutch and/or an additional spool valve in the pump pressure lines between the reversible pump and the clutch.

The foregoing description is considered illustrative only. The terminology that is used is intended to be in the nature of words of description rather than of limitation. Many modifications and variations will readily occur to those skilled in the art in view of the description. Thus, the foregoing description is not intended to limit the invention to the embodiments described above. Accordingly the scope of the invention as defined by the appended claims.

What is claimed is:

1. A vehicle powertrain hydraulic system (10), comprising:
   a clutch (12);
   a shift selector (14);
   a piston and cylinder assembly (16), including:
      a cylinder (60), and
      a piston (62) disposed in the cylinder to drive the shift selector;
   a fluid supply (20);
   a reversible pump (82) in fluid communication with the fluid supply to pressurize fluid from the fluid supply;
   a first fluid pressure and control line (91) from the pump to a first side of the piston;
   a second fluid pressure and control line (92) from the pump to a second side of the piston; and
   a third fluid pressure line (93) to the clutch from the cylinder in a location between the first and second sides of the piston, wherein the piston is also a valve to control fluid flow through the third fluid pressure line from the cylinder to the clutch.

2. The system of claim 1, further comprising a prime mover (80) coupled to the pump to rotatably drive the reversible pump and a centrifugal regulator (84) coupled to the prime mover to regulate supply of fluid to the fluid pressure lines.

3. The system of claim 1, further comprising:
   a first pump supply line (94) between the fluid supply and a first port (96) of the pump;
   a first supply check valve (98) in the first pump supply line;
   a second pump supply line (100) between the fluid supply and a second port (102) of the pump and having an upstream end located upstream of the first check valve; and
   a second supply check valve (104) in the second pump supply line.

4. The system of claim 3, wherein the first fluid pressure and control line extends between the second port of the pump and the first side of the piston, and the second fluid pressure and control line extends between the first port of the pump and the second side of the piston and has an upstream end between the first supply check valve and the first port of the pump.

5. The system of claim 4, further comprising:
   a pressure regulator (84) in fluid communication with the first and second fluid pressure and control lines;
   a first pressure check valve (06) between the pressure regulator and the second port of the pump; and
   a second pressure check valve (108) between the pressure regulator st port of the pump.

6. The system of claim 1, excluding at least one of an additional electromechanical valve in the pump pressure lines between the reversible pump and the clutch or an additional spool valve in the pump pressure lines between the reversible pump and the clutch.

7. The system of claim 1, wherein the clutch is carried in a clutch cylinder that is part of a housing that is integral with the cylinder of the piston and cylinder assembly.

8. The system of claim 1, wherein the shift selector includes a detent arrangement (252) to hold the shift selector in detents corresponding to different operational modes, wherein the detent arrangement is carried within the cylinder of the piston and cylinder assembly, spaced apart from the shift fork on an opposite side of the piston of the piston and cylinder assembly.

9. A vehicle powertrain product having the system of claim 1.

10. A vehicle powertrain hydraulic system (10), comprising:
   a clutch (12);
   a shift selector (14);
   a piston and cylinder assembly (16), including:
      a cylinder (60), and
      a piston (62) disposed in the cylinder to drive the shift selector;
   a fluid supply (20);
   an hydraulic pump and regulator apparatus (18), including:

an electric motor (80),
a reversible pump (82) in fluid communication with the fluid supply and coupled to the motor to pressurize fluid from the fluid supply, and
a centrifugal regulator (84) coupled to the motor;
a first fluid pressure line (91) from the pump to a first side of the piston;
a second fluid pressure line (92) from the pump to a second side of the piston,
wherein the centrifugal regulator is in fluid communication with the first and second pump pressure lines; and
a third fluid pressure line (93) to the clutch from the cylinder in a location between the first and second sides of the piston, wherein the piston is also a valve to control fluid flow through the third fluid pressure line from the cylinder to the clutch.

11. The system of claim 10, further comprising:
a first pump supply line (94) between the fluid supply and a first port (96) of the pump;
a first supply check valve (98) in the first pump supply line;
a second pump supply line (100) between the fluid supply and a second port (102) of the pump and having an upstream end located upstream of the first supply check valve; and
a second supply check valve (104) in the second pump supply line,
wherein the first fluid pressure line extends between the second port of the pump and the first side of the piston, and the second fluid pressure line extends between the first port of the pump and the second side of the piston and has an upstream end between the first supply check valve and the first port of the pump.

12. The system of claim 11, further comprising:
a first pressure check valve (106) between the pressure regulator and the second port of the pump; and
a second pressure check valve (108) between the pressure regulator and the first port of the pump.

13. The system of claim 10, excluding at least one of an additional electromechanical valve in the pump pressure lines between the reversible pump and the clutch or an additional spool valve in the pump pressure lines between the reversible pump and the clutch.

14. A method of operating a hydraulic system (10) of a vehicle powertrain product, comprising the steps of:
operating a reversible pump (82) in a first mode and in a first rotational direction, with a pressure regulator (84) in a recirculation position, to draw fluid from a fluid supply (86) through a first pump supply line (96) and expel fluid under pressure through a first fluid pressure line (91) through the pressure regulator (84) back to the fluid supply;
operating the pump in a second mode and at a rotational speed faster than that of the first mode, with the pressure regulator in a diversion position, to divert fluid to a first piston pressure chamber (61) against a first side of a piston (62) coupled to a shift selector (14) to thereby displace the shift selector from a first detent position to a second detent position;
operating the pump in a third mode and in an opposite second rotational direction, with the pressure regulator in the recirculation position, to draw fluid from the fluid supply through a second pump supply line (100) and expel fluid under pressure through a second fluid pressure line (92) through the pressure regulator back to the fluid supply;
operating the pump in a fourth mode and at a rotational speed faster than that of the third mode; with the pressure regulator in the diversion position, to divert fluid to a second piston pressure chamber (63) against a second side of the piston to thereby displace the shift selector from the second detent position to the first detent position;
wherein during and after the second mode of operation, the piston is moved to a first position that closes off a second fluid inlet (68) of a cylinder (60) in which the piston is disposed and opens communication between a first fluid inlet (66) of the cylinder and a fluid outlet (70) of the cylinder so that fluid pressurized by the pump flows to a clutch (12) to activate the clutch,
wherein during and after the fourth mode of operation, the piston is moved to a second position that closes off the first fluid inlet and opens communication between the second fluid inlet and the fluid outlet so that fluid pressurized by the pump flows to the clutch to activate the clutch, and
wherein the clutch is deactivated when the piston is moved to an intermediate third position between the first and second positions such that the piston closes off the fluid outlet from the first and second fluid inlets, such that piston is also a valve to control fluid flow through the third fluid pressure line from the cylinder to the clutch.

\* \* \* \* \*